(12) United States Patent
Qiu et al.

(10) Patent No.: US 11,781,724 B2
(45) Date of Patent: Oct. 10, 2023

(54) LIGHT-REGULATING MECHANISM, VEHICLE LIGHT MODULE, VEHICLE LIGHT AND VEHICLE

(71) Applicant: HASCO VISION TECHNOLOGY CO., LTD., Shanghai (CN)

(72) Inventors: Zhiping Qiu, Shanghai (CN); Hui Li, Shanghai (CN); Langrun Jin, Shanghai (CN); He Zhu, Shanghai (CN); Wenhui Sang, Shanghai (CN)

(73) Assignee: HASCO VISION TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 18/009,510

(22) PCT Filed: Feb. 26, 2021

(86) PCT No.: PCT/CN2021/078234
§ 371 (c)(1),
(2) Date: Dec. 9, 2022

(87) PCT Pub. No.: WO2022/178855
PCT Pub. Date: Sep. 1, 2022

(65) Prior Publication Data
US 2023/0220969 A1    Jul. 13, 2023

(51) Int. Cl.
*F21S 41/19* (2018.01)
*F21S 41/657* (2018.01)

(52) U.S. Cl.
CPC .......... *F21S 41/657* (2018.01); *F21S 41/192* (2018.01)

(58) Field of Classification Search
CPC .......... F21S 41/19; F21S 41/192; B60Q 1/045
See application file for complete search history.

(56) References Cited

FOREIGN PATENT DOCUMENTS

| CN | 103363455 A | 10/2013 |
|---|---|---|
| CN | 203517576 U | 4/2014 |
| CN | 105402654 A | 3/2016 |
| CN | 106224874 A | 12/2016 |
| CN | 212673117 U | 3/2021 |

*Primary Examiner* — Robert J May
(74) *Attorney, Agent, or Firm* — Volpe Koenig

(57) ABSTRACT

A light-regulating mechanism comprising a first ball head connector, a second ball head connector, a third ball head connector and a sliding connector. One end of the first ball head connector and one end of the second ball head connector are connected to an illumination unit. The other ends thereof are connected to a supporting frame or a light body. The illumination unit is provided with a sliding support. The sliding connector can slide on the sliding support. One end of the third ball head connector is connected to the sliding connector in a sliding manner, and the other end thereof can move on the supporting frame or the light body to drive the sliding connector to slide on the sliding support, so that light regulation in a first direction is realized. Further disclosed are a vehicle light module comprising the light-regulating mechanism, a vehicle light and a vehicle.

20 Claims, 8 Drawing Sheets

LIGHT-REGULATING MECHANISM, VEHICLE LIGHT MODULE, VEHICLE LIGHT AND VEHICLE

CROSS REFERENCE TO RELATED APPLICATIONS

This application is a 35 U.S.C. § 371 national stage of International Application No. PCT/CN2021/078234, which was filed Feb. 26, 2021 and is incorporated herein by reference as if fully set forth.

FIELD OF THE INVENTION

The present disclosure relates to a vehicle light part, and particularly, relates to a light-regulating mechanism. In addition, the present disclosure further relates to a vehicle light module, a vehicle light and a vehicle.

BACKGROUND OF THE INVENTION

The light shape of a vehicle light and particularly a headlight needs to be regulated and calibrated to a standard position before use or in the mounting process. Therefore, a light-regulating mechanism needs to be arranged on a vehicle light module, so that a projection light shape of an illumination unit can be adjusted in an up-down or left-right direction to irradiate the designed standard position and form a standard light shape (the light shape mentioned in this specification is a light shape projected on a standard screen, and for the higher beam or lower beam of the headlight, the standard screen is a vertical screen arranged at the position of 25 m in front of a vehicle light module). As shown in FIG. 1 to FIG. 3, $P_0$ represents the standard position of the light shape, $P_1$, $P_2$, $P_3$ and $P_4$ represent position shifted light shapes initially formed by the vehicle light module, wherein the light shape shown as $P_1$ needs to be regulated downwards, the light shape shown as $P_2$ needs to be regulated upwards, the light shape shown as $P_3$ needs to be regulated rightwards, and the light shape shown as $P_4$ needs to be regulated leftwards, so that the light shape $P_0$ located at the standard position is obtained.

An existing light-regulating mechanism generally uses three ball head screw assemblies to carry out light regulation. A screw of the ball head screw assembly is provided with a thread and is connected with a supporting frame or a light body through the thread, a ball head is arranged at the front end of the screw, the ball head is movably connected with a ball head nut fixed to a illumination unit, and the illumination unit can be driven to move relative to the supporting frame or the light body by rotating the screw of the ball head screw assembly. Generally, one of the three ball head screw assemblies is a ball head screw assembly fixed relative to the supporting frame or the light body, the other two ball head screw assemblies are adjustable ball head screw assemblies capable of moving front and back relative to the supporting frame or the light body. One of the two adjustable ball head screw assemblies is arranged below the fixed ball head screw assembly, and by rotating the screw of the adjustable ball head screw assembly, the illumination unit can rotate up and down around a horizontal axis relative to the supporting frame or the light body, thereby realizing light regulation in an up-down direction; and the other adjustable ball head screw assembly is arranged on the left side or the right side of the fixed ball head screw assembly, and by rotating the screw of the adjustable ball head screw assembly, the illumination unit can rotate left and right around a vertical axis relative to the supporting frame or the light body, thereby realizing light regulation in the left-right direction.

The existing light-regulating mechanism realizes light regulation in the up-down direction and the left-right direction, but at least has two following defects that: firstly, in order to realize up-down and left-right light regulation, the adjustable ball head screw assemblies need to be arranged beside and below the fixed ball head screw assembly, and the ball head nut generally has a large size, resulting in that an overall size of the light-regulating mechanism in the up-down direction or the left-right direction is relatively large and cannot be applicable to the flattening trend of the existing vehicle light module and the space arrangement requirement of the smaller and smaller vehicle light module; secondly, if the size of the vehicle light module in the up-down direction or the left-right direction is relatively small, a distance between two ball head screw assemblies in the up-down direction or the left-right direction is relatively short, resulting in that a a force arm of an adjusting force formed when the screw of the ball head screw assembly is adjusted is relatively short, and the requirement for the adjusting force formed when the ball head screw assembly is adjusted is raised; and meanwhile, the rotating angle of the illumination unit, which is formed by the same moving distance of the adjustable ball head screw assemblies, is relatively large, and the light regulating precision is reduced.

SUMMARY OF THE INVENTION

The technical problem to be solved by the disclosure is to provide a light-regulating mechanism, and the light-regulating mechanism is small in occupied space, high in light regulating precision and convenient to manufacture.

The technical problem to be further solved by the disclosure is to provide a vehicle light module, and a light-regulating mechanism of the vehicle light module is simple in structure, small in occupied space and high in light regulating precision.

The technical problem to be further solved by the disclosure is to provide a vehicle light, and a light-regulating mechanism of the vehicle light is small in occupied space and high in light regulating precision.

The technical problem to be further solved by the disclosure is to provide a vehicle, and the vehicle is small in vehicle light volume and high in light shape positioning accuracy.

To solve the technical problems described above, in the first aspect, the present disclosure provides a light-regulating mechanism used for carrying out light regulation on an illumination unit. The light-regulating mechanism includes a first ball head connector, a second ball head connector, a third ball head connector and a sliding connector; one end of each of the first ball head connector and the second ball head connector is connected with the illumination unit, while the other end is connected with a supporting frame or a light body; and the illumination unit is provided with a sliding support, the sliding connector is in sliding connection with the sliding support, one end of the third ball head connector is in sliding connection with the sliding connector, the other end of the third ball head connector is supported on the supporting frame or the light body, and the third ball head connector can move relative to the supporting frame or the light body, so that the sliding connector can be driven to move, and the sliding support and the illumination unit connected with the sliding support can be driven to rotate through the sliding connector to realize light regulation in a first direction.

Preferably, the sliding connector includes a first chute and a second chute arranged in different directions, the sliding support is mounted in the first chute and is able to slide relative to the first chute, and a ball head of the third ball head connector is mounted in the second chute and is able to slide in the second chute. In the preferred technical solution, through sliding between the sliding support and the first chute and sliding between the ball head of the third ball head connector and the second chute, movement of the third ball head connector is better transferred to the illumination unit so as to realize light regulation on the illumination unit.

Further preferably, a sliding track of the first chute and a sliding track of the second chute are not located in the same plane. Through the preferred technical solution, movement of the third ball head connector can be better converted into rotation of the sliding connector so as to drive the illumination unit to rotate.

Preferably, the sliding support includes a sliding supporting plate and a reinforcing rib, the first chute is provided with a first rabbet, the sliding connector is mounted on the sliding support so as to enable the sliding supporting plate to slide in the first chute, and the reinforcing rib is located in the first rabbet. In the preferred technical solution, the matching accuracy between the sliding supporting plate and the chute is higher, arrangement of the reinforcing rib can improve the mechanical strength of the sliding supporting plate, arrangement of the first rabbet can simplify the structure of the chute, and the matching accuracy between the sliding support and the sliding connector can be further improved through matching of the first rabbet and the reinforcing rib.

Further preferably, an elastic supporting structure is arranged on the inner wall of one side, opposite to the first rabbet, of the first chute, and the elastic supporting structure is in elastic contact with the sliding supporting plate. Through the preferred technical solution, under the elastic force action of the elastic supporting structure, the sliding connector is in close contact with the sliding support, so that a fit clearance between the sliding connector and the sliding support is reduced, and the matching accuracy is improved.

Preferably, both the first ball head connector and the second ball head connector are ball head screw assemblies, the ball head screw assembly includes a ball head screw and a ball head nut, the ball head screw is connected with the supporting frame or the light body, and the ball head nut is connected with the illumination unit; the ball head nut of the second ball head connector is connected with the illumination unit, and the ball head screw of the second ball head connector is supported on the supporting frame or the light body and is able to move relative to the supporting frame or the light body, so that light regulation in a second direction can be implemented through driving the illumination unit to rotate; and the third ball head connector is a ball head adjusting screw, the ball head adjusting screw includes a screw ball head and an adjusting screw, the sliding connector includes a first chute and a second chute, the second chute is provided with a second rabbet, the screw ball head is mounted in the second chute so as to enable the screw ball head to slide in the second chute, and the adjusting screw passes through the second rabbet. Through the preferred technical solution, precision fit between the screw ball head and the second chute can be formed, the adjusting screw can move in the second rabbet relative to the sliding connector, and mobility of connection between the third ball head connector and the sliding connector is improved.

Preferably, the first direction is an up-down direction, and the second direction is a left-right direction; and a connecting line between a ball head sphere center of the first ball head connector and a ball head sphere center of the second ball head connector extends along the second direction, and both a sliding direction of the sliding connector on the sliding support and a sliding direction of the third ball head connector relative to the sliding connector are not located in the second direction. In the preferred technical solution, light regulation is respectively carried out in the up-down direction and the left-right direction, and light regulation is relatively convenient. The sliding direction, different from the second direction, of the sliding connector relative to the sliding support and the third ball head connector is convenient to realize light regulation in the first direction.

Further preferably, the sliding support is slantingly arranged in a vertical plane in a front-back direction relative to a horizontal plane, and the ball head sphere center of the first ball head connector, the ball head sphere center of the second ball head connector and a ball head sphere center of the third ball head connector are arranged in the same horizontal plane. Through the preferred technical solution, the first ball head connector, the second ball head connector and the third ball head connector are arranged in the same horizontal plane, which is beneficial to flattening of the light-regulating mechanism. The slanting arrangement of the sliding support in the front-back direction is convenient to realize light regulation in the up-down direction.

Preferably, both the first ball head connector and the second ball head connector are ball head screw assemblies, the ball head screw assembly includes a ball head screw and a ball head nut, the ball head screw is fixed on the supporting frame or the light body, and the ball head nut is fixed on the illumination unit; and the third ball head connector is a ball head adjusting screw, the ball head adjusting screw includes a screw ball head and an adjusting screw, the sliding connector includes a first chute and a second chute, the second chute is provided with a second rabbet, the screw ball head is mounted in the second chute so as to enable the screw ball head to slide in the second chute, and the adjusting screw passes through the second rabbet. In the preferred technical solution, the ball head screws of the first ball head connector and the second ball head connector are both fixed on the supporting frame or the light body, and thus, light regulation cannot be carried out in the direction of the connecting line of the ball head sphere centers of the first ball head connector and the second ball head connector, but the connecting structure is relatively simple, and the production cost is also relatively low. Precision fit can be formed between the screw ball head of the third ball head connector and the second chute, the adjusting screw can move in the second rabbet relative to the sliding connector, and mobility of connection between the third ball head connector and the sliding connector is improved.

In the second aspect, the present disclosure provides a vehicle light module, including the light-regulating mechanism provided by the present disclosure in the first aspect and the illumination unit.

Preferably, the illumination unit includes a heat dissipating part, and the sliding support is integrally formed on the heat dissipating part. In the preferred technical solution, the setting of integrally forming the sliding support and the heat dissipating part simplifies the structure of the light-regulating mechanism, and is convenient to dim the illumination unit.

In the third aspect, the present disclosure provides a vehicle light, including the vehicle light module provided by the present disclosure in the second aspect.

In the fourth aspect, the present disclosure provides a vehicle, including the vehicle light provided by the present disclosure in the third aspect.

Through the technical solutions above, the light-regulating mechanism provided by the present disclosure converts front-back movement of the third ball head connector into rotation of the illumination unit by the sliding connector so as to realize light regulation in the first direction. According to the light-regulating mechanism, the third ball head connector does not need to be arranged on one side of the first ball head connector along the first direction, so a size of the illumination unit in the first direction can be reduced, and implementation of miniaturization and flattening of the illumination unit in the first direction is facilitated. Motion conversion between the third ball head connector and the illumination unit is implemented through the sliding connector, and a distance between the movement direction of the third ball head connector and the connecting line of the ball head sphere centers of the first ball head connector and the second ball head connector can be increased, so that the light regulating torque and the light regulating precision of the third ball head connector are improved. The sliding support arranged on the illumination unit is simple in structure, and convenient for manufacturing of the illumination unit. The illumination unit can be driven to rotate through movement of the ball head screw of the second ball head connector relative to the supporting frame or the light body so as to realize light regulation in the second direction. The vehicle light module provided by the present disclosure is simple in structure, small in occupied space, and also higher in light regulating precision. The vehicle light and the vehicle provided by the present disclosure also have the advantages above.

Other advantages of the present disclosure and the technical effects of the preferred embodiments will be further illustrated in the specific embodiments below.

Figure 1:
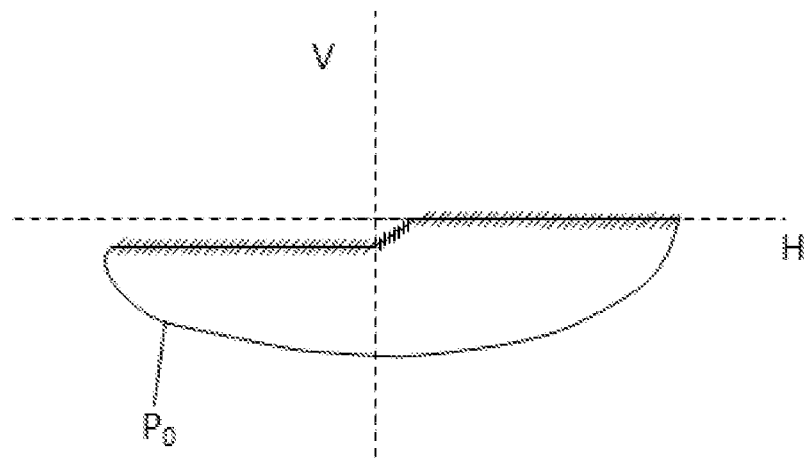
FIG. 1 is a diagram of a light shape at a standard position.
Figure 2:
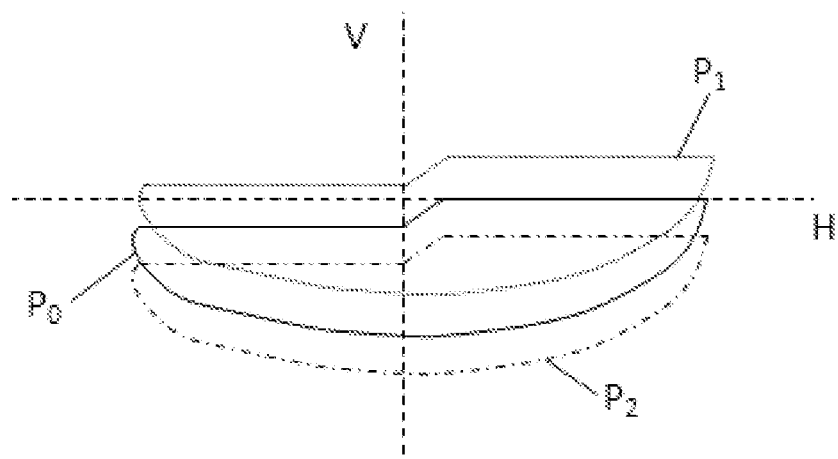
FIG. 2 is a schematic diagram of an up-down adjusted light shape.
Figure 3:
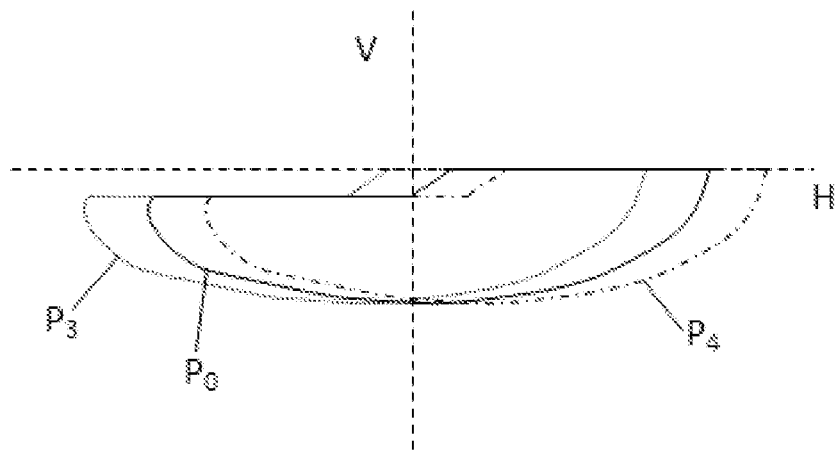
FIG. 3 is a schematic diagram of a left-right adjusted light shape.

BRIEF DESCRIPTION OF THE SYMBOLS 1a. first ball head connector, 1b. second ball head connector,
1c. third ball head connector, 2. illumination unit,
4. sliding support, 41.sliding supporting plate,
42. reinforcing rib, 6. sliding connector,
61. first chute, 611.first rabbet,
612. elastic supporting structure, 62. second chute,
621. second rabbet.

DETAILED DESCRIPTION OF THE EMBODIMENTS

In the present disclosure, in the absence of explanation to the contrary, directional or positional relationships indicated by used positional words such as "front, back, up, down, left and right" are based on directional or positional relationships after an vehicle light of the present disclosure is normally mounted on a vehicle, wherein the direction indicated by the positional word "front" is the normal running direction of the vehicle. Description on the directional or positional relationship of the light-regulating mechanism and the vehicle light module of the prevent disclosure and parts thereof is consistent with mounting positions in the actual using process. It should be noted that use of the positional words is just to facilitate description of the present disclosure and simplify the description, but does not indicate or imply that the devices or components must have specific directions, or be constructed or operated in the specific directions, and thus should not be understood as limitation to the present disclosure.

Terms such as "first", "second", "third" are merely used for description, but should not be understood as indication or implication on relative importance or implicit indication on the quantity of the indicated technical characteristics, and thus, characteristics defined with "first", "second" and "third" can explicitly or implicitly include one or more characteristics.

In the description of the present disclosure, it should be illustrated that unless otherwise expressly stipulated or defined, terms such as "connected" and "connecting" should be broadly understood, and for example, the term "connected" may be fixedly connected, or may be detachably connected, or integrally connected; may be directly connected, or may be indirectly connected by a medium; or may be internally communicated between two components or an interaction relationship between two components. Those ordinary skilled in the art may understand the specific meanings of the terms above in the present disclosure according to specific conditions.

The specific embodiments of the present disclosure will be illustrated in detail below in combination with the accompanying drawings. It should be understood that the specific embodiments described here are only provided to describe and explain the present disclosure, and the scope of protection of the present disclosure is not limited to the undermentioned specific embodiments.

A light-regulating mechanism of the present disclosure is a mechanism mounted between an illumination unit 2 and a supporting frame or a light body and used for carrying out dimming on the illumination unit 2.

According to one embodiment of a light-regulating mechanism of the present disclosure, as shown in FIG. 4 to FIG. 7, the light-regulating mechanism includes a first ball head connector 1a, a second ball head connector 1b, a third ball head connector 1c and a sliding connector 6. One end of the first ball head connector 1a is connected with the illumination unit 2, while the other end is connected with a supporting frame or a light body. The first ball head connector 1a is provided with a rotating structure, so that the illumination unit 2 can rotate around the rotating structure relative to the supporting frame or the light body. A connecting position of the supporting frame or the light body on the first ball head connector 1a may be relatively fixed, and in other words, the length of the first ball head connector 1a between the illumination unit 2 and the supporting frame or the light body cannot be adjusted.

One end of the second ball head connector 1b is connected with the illumination unit 2, while the other end is connected with the supporting frame or the light body. The second ball head connector 1b is also provided with a rotating structure, so that the illumination unit 2 can rotate around the rotating structure relative to the supporting frame or the light body. The second ball head connector 1b and the supporting frame or the light body may be fixedly connected, so that the length of the second ball head connector 1b between the illumination unit 2 and the supporting frame or the light body is kept unchanged; and the second ball head connector 1b and the supporting frame or the light body also may be connected through an adjusting structure, such as a thread structure, so that a connecting position of the supporting frame or the light body on the second ball head connector 1b is movable. Therefore, through adjusting the second ball head connector 1b, the illumination unit 2 can be driven to rotate in a second direction relative to the supporting frame or the light body so as to realize light regulation in the second direction.

The illumination unit 2 is provided with a sliding support 4, and the sliding connector 6 is mounted on the sliding support 4 and can slide relative to the sliding support 4. One end of the third ball head connector 1c is in sliding connection with the sliding connector 6, while the other end is supported on the supporting frame or the light body. The third ball head connector 1c is connected with the supporting frame or the light body through an adjusting structure such as a thread structure, so that a connecting position of the supporting frame or the light body on the third ball head connector 1c is movable. Therefore, through adjusting the third ball head connector 1c, the sliding connector 6 can be driven to move, and the movement may be sliding of the sliding connector 6 relative to the sliding support 4, or may be rotation of the sliding connector 6 relative to the third ball head connector 1c. The sliding connector 6 moves to drive the sliding support 4 and the illumination unit 2 connected with the sliding support 4 to rotate in a first direction so as to realize light regulation in the first direction.

It should be illustrated that in this specification, the first direction refers to a rotating direction of the illumination unit 2 caused when the third ball head connector 1c is adjusted, and the specific direction is decided by the structure of the light-regulating mechanism, may be an up-down direction, or may be a left-right direction, or may be any other directions.

In some embodiments of the light-regulating mechanism of the present disclosure, as shown in FIG. 4 to FIG. 17, the sliding connector 6 includes a first chute 61 and a second chute 62, the first chute 61 and the second chute 62 are different in extending direction, and both may have components in a front-back direction. The shape of the first chute 61 is adaptive to the sliding support 4 so as to enable the sliding connector 6 to be mounted on the sliding support 4 through the first chute 61, and in addition, the sliding connector 6 can slide on the sliding support 4. The inner surface of the second chute 62 is of a shape formed by sweeping a contour line of a ball head of the third ball head connector 1c along a set direction, and the set direction may be a straight line, or may be an arc line. Arrangement of the second chute 62 also can reduce a stress borne by the ball head of the third ball head connector 1c in the light regulating process. The third ball head connector 1c can be mounted in the second chute 62 through matching of the ball head of the third ball head connector 1c and the second chute 62, and slide in the second chute 62 along an extending direction of the second chute 62. Meanwhile, the ball head of the third ball head connector 1c also can rotate in the second chute 62. When the third ball head connector 1c is adjusted, the third ball head connector 1c moves along a fixed direction and drives movement and rotation of the sliding connector 6 through matching of the ball head of the third ball head connector 1c and the second chute 62, and movement and rotation of the sliding connector 6 further can drive rotation of the illumination unit 2 through matching of the first chute 61 and the sliding support 4 so as to realize light regulation of the illumination unit 2 in the first direction. Generally, on a cross section of a matching structure of the first chute 61 and the sliding support 4, the sliding connector 6 and the sliding support 4 are in closed fit in the first direction and has a fit clearance in a direction perpendicular to the first direction, so that when the light regulating precision in the first direction is ensured, the mobility of the sliding connector 6 is improved, and the stress borne by the ball head of the third ball head connector 1c in the light regulating process is reduced.

In some embodiments of the light-regulating mechanism of the present disclosure, as shown in FIG. 4 to FIG. 17, a sliding track of the first chute 61 and a sliding track of the second chute 62 on the sliding connector 6 are not located in the same plane, so that when the third ball head connector 1c moves relative to the supporting frame or the light body, it is easier to drive rotation of the sliding connector 6.

In some embodiments of the light-regulating mechanism of the present disclosure, as shown in FIG. 4 to FIG. 17, the sliding support 4 includes a sliding supporting plate 41 and a reinforcing rib 42 arranged on one side of the sliding supporting plate 41. Arrangement of the reinforcing rib 42 effectively improves the mechanical strength of the sliding support 4 in a case of increasing the weight of the sliding support 4 a little. Generally, the reinforcing rib 42 is arranged on the lower side of the sliding supporting plate 41, and arranged along a length direction of the sliding supporting plate 41, i.e., the front-back direction. Correspondingly, a first rabbet 611 is formed on one side of the first chute 61. When the sliding connector 6 is mounted on the sliding support 4, the reinforcing rib 42 is located in the first rabbet 611, so that the matching accuracy between the sliding connector 6 and the sliding support 4 is improved, and the stability of sliding of the sliding connector 6 on the sliding support 4 is improved.

As one specific embodiment of the light-regulating mechanism of the present disclosure, as shown in FIG. 8 to FIG. 17, an elastic supporting structure 612 is arranged on the inner wall of one side, opposite to the first rabbet 611, of the first chute 61. The elastic supporting structure 612 is an elastic structure of which one side is fixed to the inner wall of the first chute 61, and when the sliding connector 6 is mounted on the sliding support 4, the elastic supporting structure 612 is pressed to generate deformation towards the inner wall of the first chute 61, a formed opposite acting force can be acted on the sliding support 4, and then one surface, away from the elastic supporting structure 612, of the sliding support 4 is clung to the inner wall of the first chute 61, so that the stability of sliding of the sliding connector 6 on the sliding support 4 is improved. The elastic supporting structures 612 may be set as pairs of arc elastic sheets extending along the direction of the sliding track of the first chute 61. Specifically, one side of the elastic supporting structure 612 is fixed on the inner wall of the first chute 61, the other side of the elastic supporting structure 612 is suspended in the first chute 61, and the middle of the elastic supporting structure 612 is bent to form a curved surface structure with elasticity. When the sliding supporting plate 41 is inserted into the first chute 61, the curved surface structure in the middle of the elastic supporting structure 612 is pressed on the sliding supporting plate 41 under the action of an elastic force, so that one surface of the sliding supporting plate 41 is in elastic contact with the elastic supporting structure 612, while the other surface is clung to the inner wall of the first chute 61, and thus, when stability of connection of the sliding connector 6 and the sliding support 4 is improved, free sliding of the sliding connector 6 on the sliding support 4 also cannot be influenced.

Figure 4:
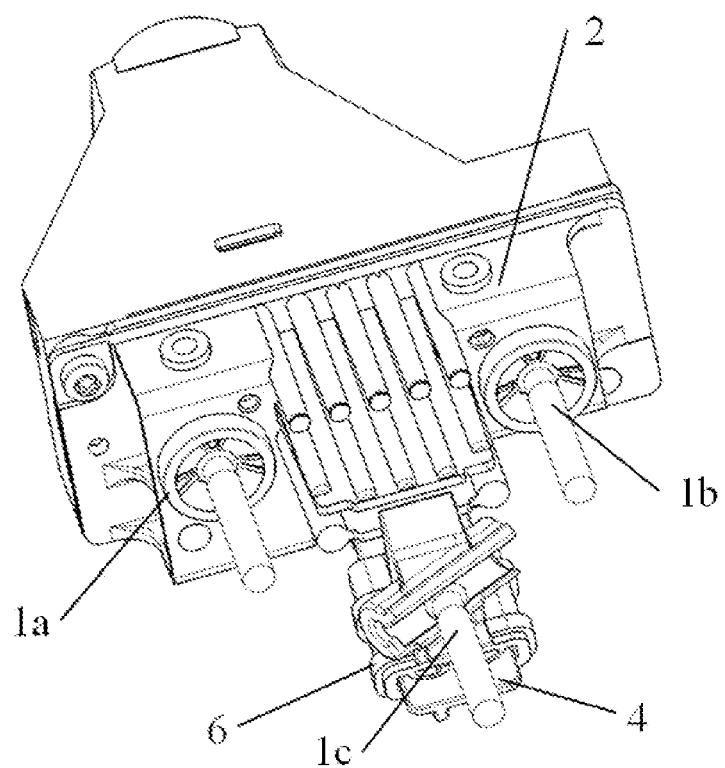
FIG. 4 is a structural schematic diagram of one embodiment of a light-regulating mechanism of the present disclosure.
Figure 5:
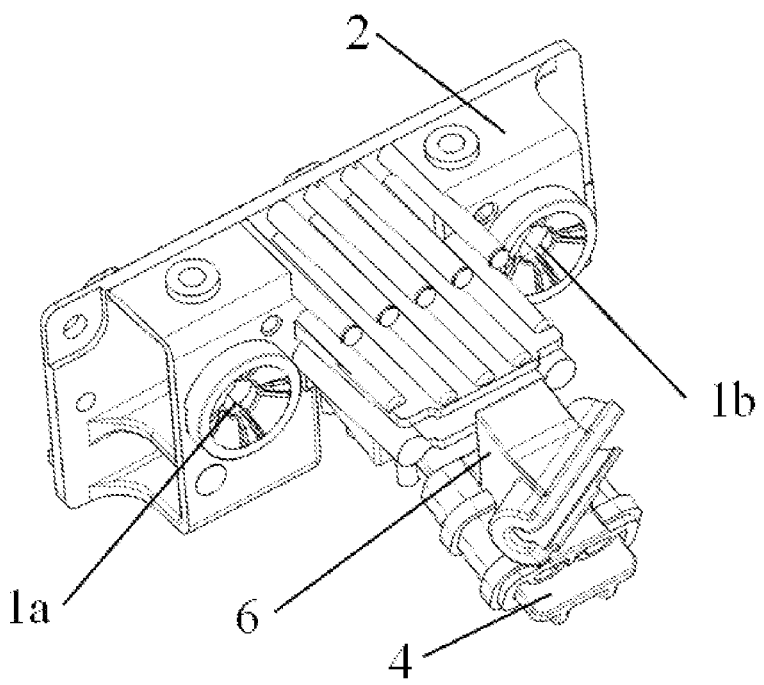
FIG. 5 is a structural schematic diagram (which does not include a ball head screw) of one embodiment of the light-regulating mechanism of the present disclosure.
Figure 6:
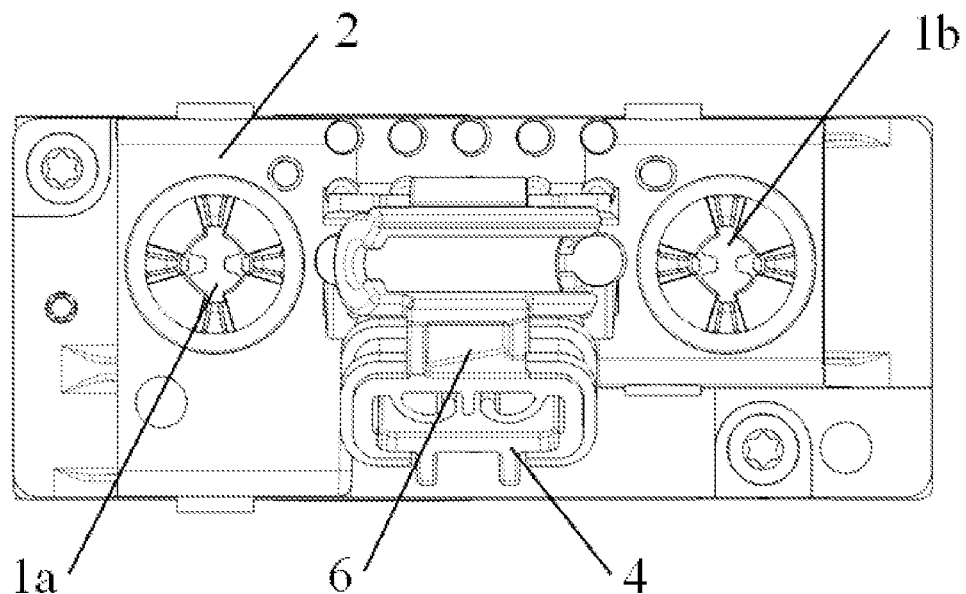
FIG. 6 is a rear view of FIG. 5.
Figure 7:
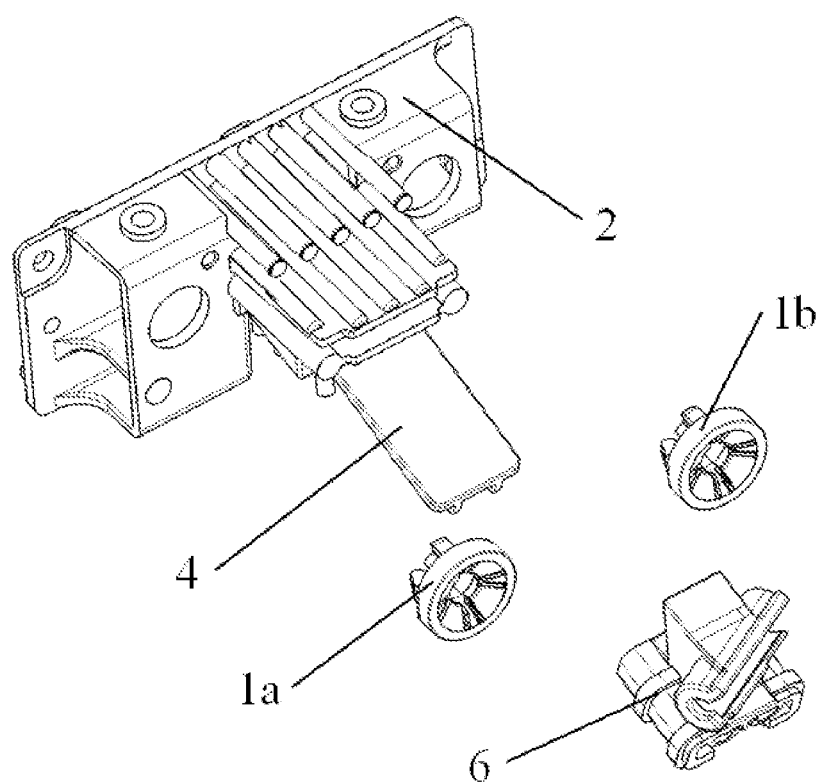
FIG. 7 is an exploded view of FIG. 5.
Figure 8:
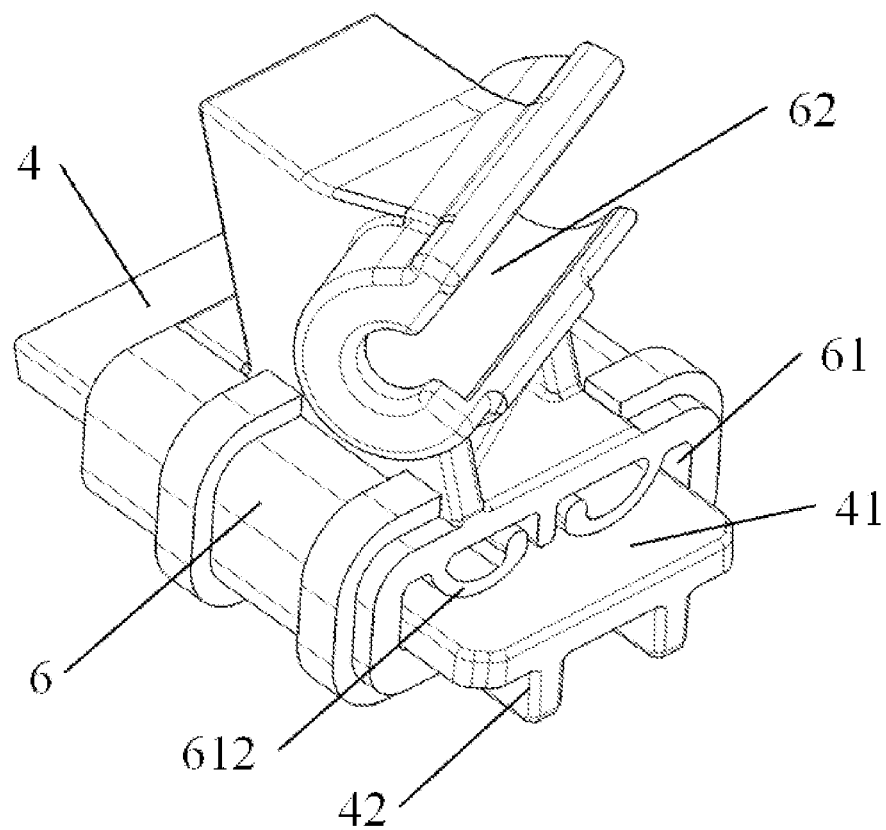
FIG. 8 is a structural schematic diagram of a matching state of a sliding connector and a sliding support in one embodiment of the light-regulating mechanism of the present disclosure.
Figure 9:
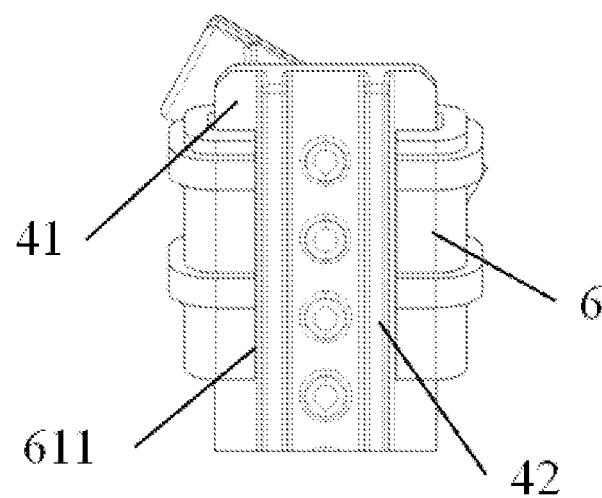
FIG. 9 is a bottom view of FIG. 8.
Figure 10:
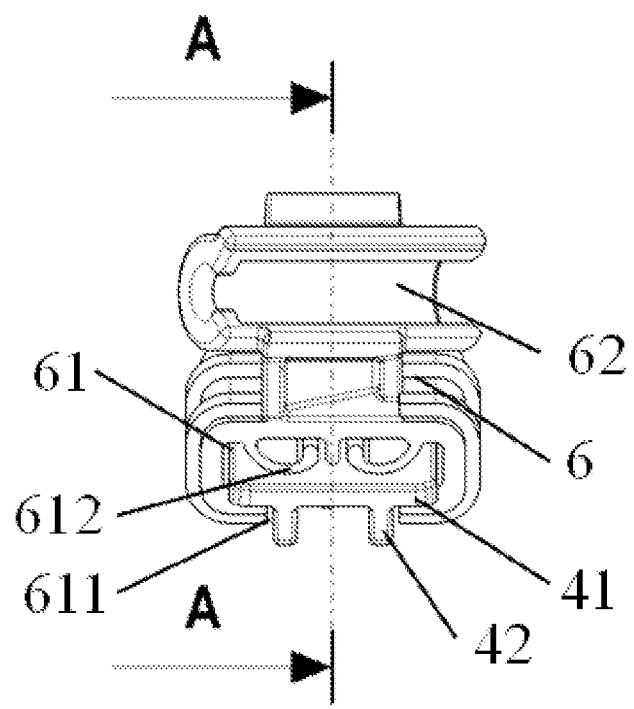
FIG. 10 is a rear view of FIG. 8.
Figure 11:
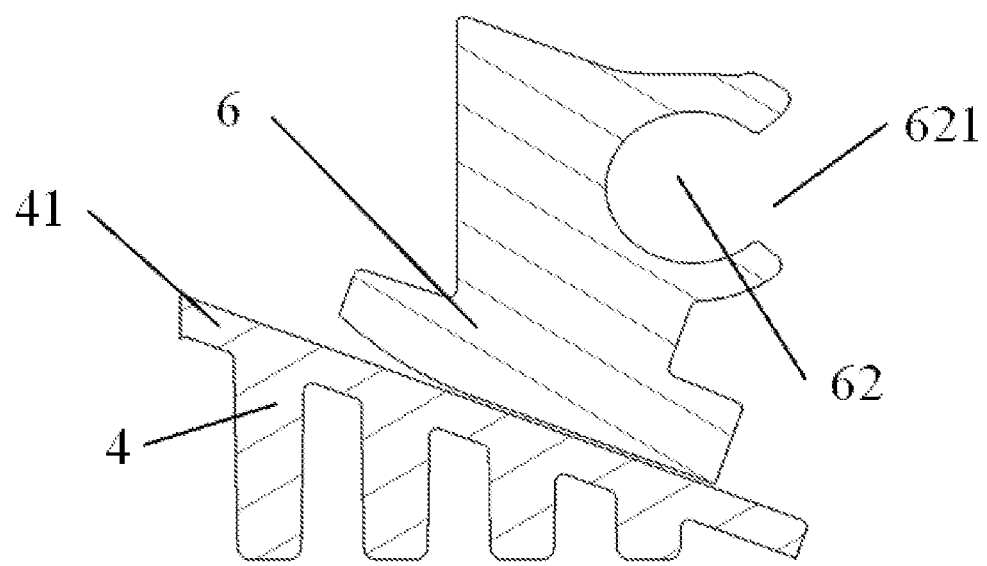
FIG. 11 is a section view of an A-A direction in FIG. 10.
Figure 12:
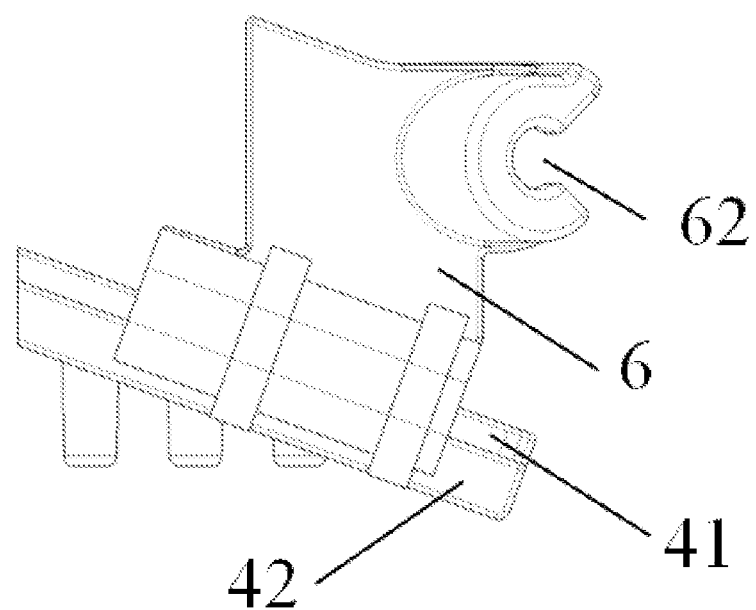
FIG. 12 is a side view of FIG. 8.
Figure 13:
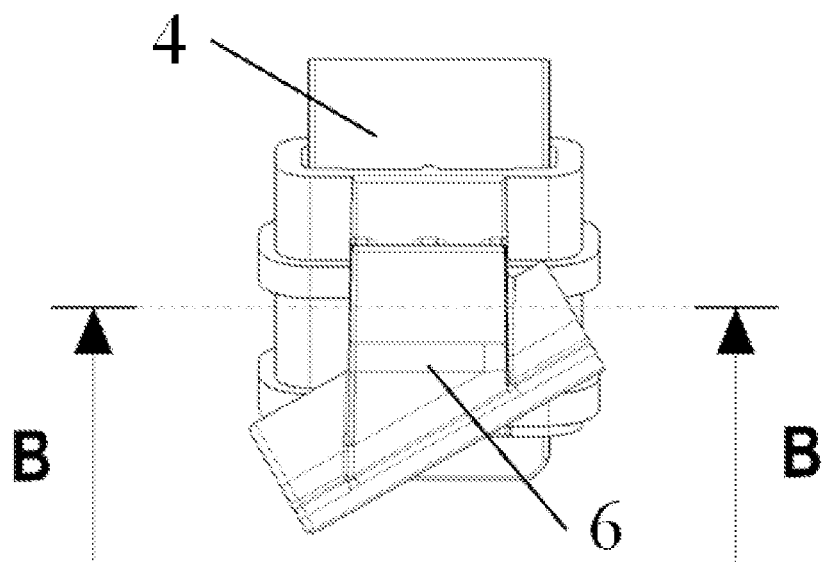
FIG. 13 is a top view of FIG. 8.
Figure 14:
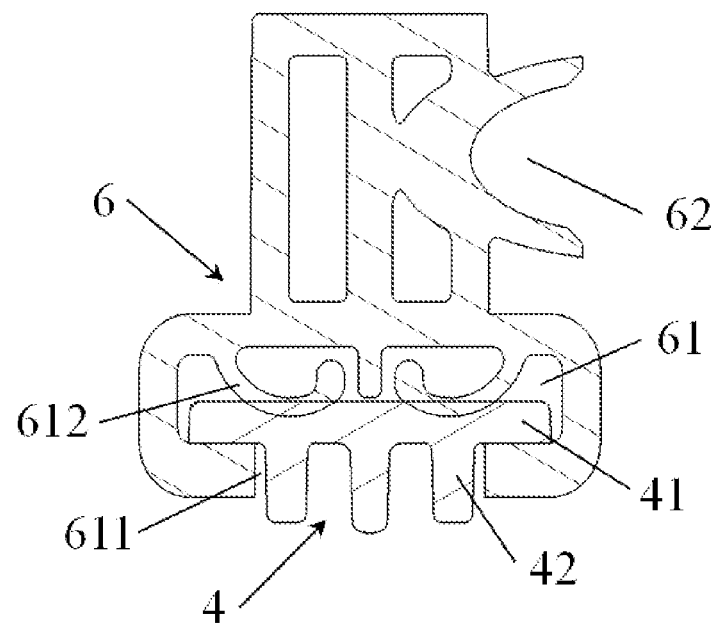
FIG. 14 is a section view of a B-B direction of FIG. 13.
Figure 15:
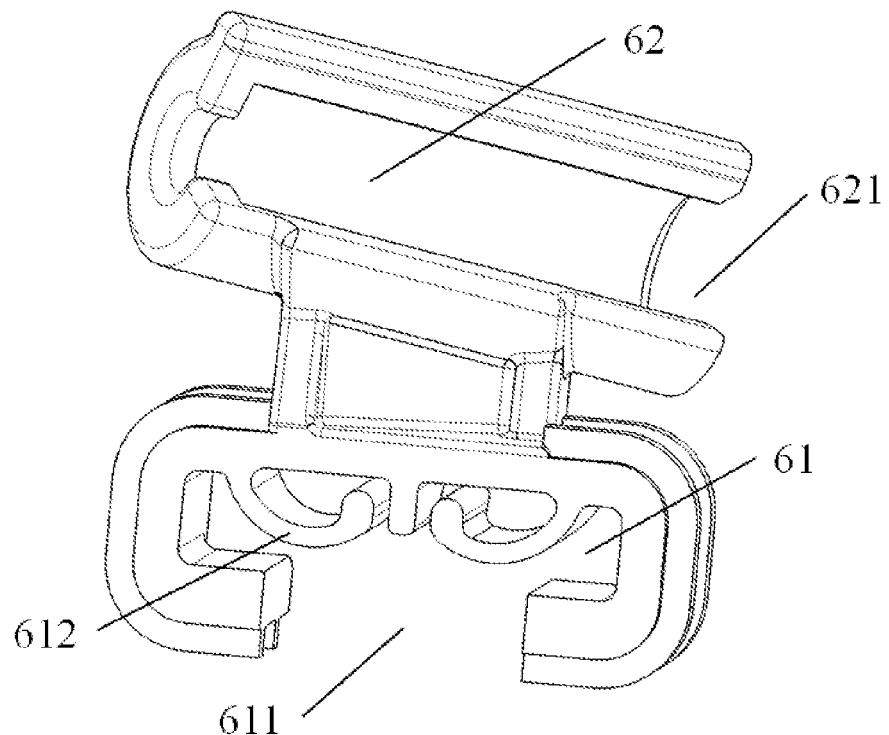
FIG. 15 is a structural schematic diagram of a sliding connector in one embodiment of the light-regulating mechanism of the present disclosure.
Figure 16:
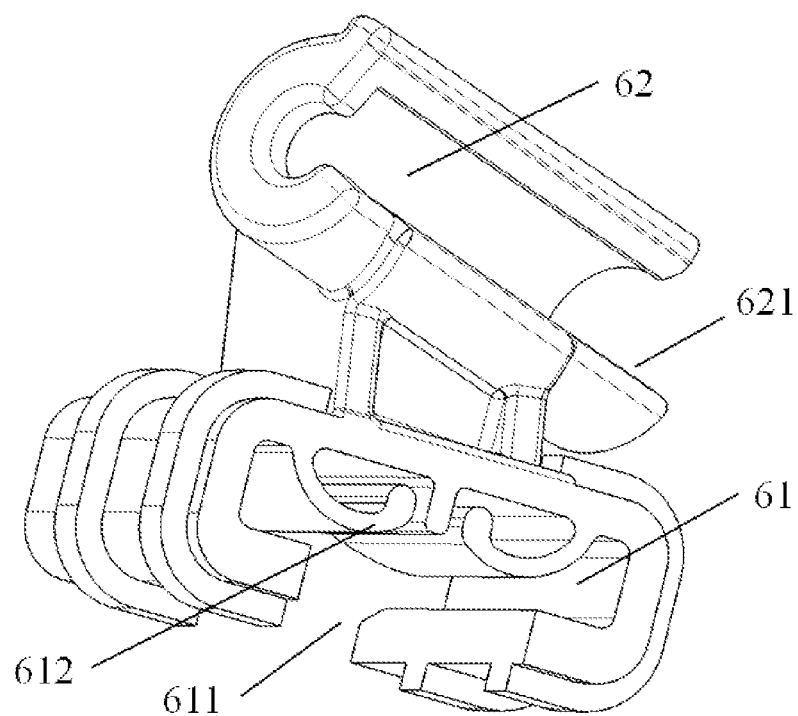
FIG. 16 is a stereogram of FIG. 15 from another angle.
Figure 17:
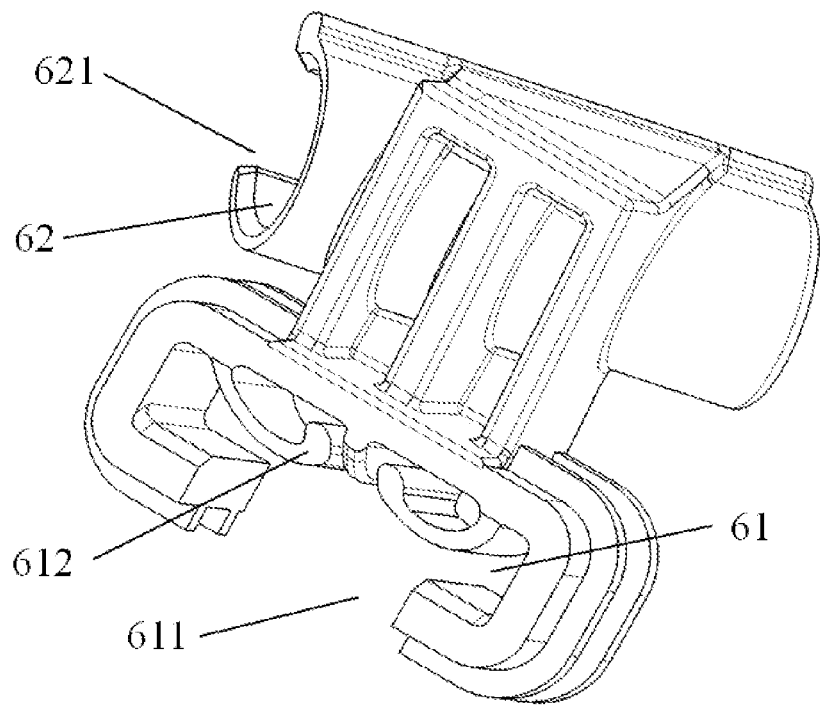
FIG. 17 is a stereogram of FIG. 15 from yet another angle.

In some embodiments of the light-regulating mechanism of the present disclosure, as shown in FIG. 4, both the first ball head connector 1a and the second ball head connector 1b are ball head screw assemblies, the ball head screw assembly includes a ball head screw and a ball head nut, the ball head screw is connected with the ball head nut, and a ball head of the ball head screw can rotate in the ball head nut. The ball head screw is connected with the supporting frame or the light body, and the ball head nut is connected with the illumination unit 2, so that the illumination unit 2 can rotate relative to the supporting frame or the light body. The ball head screw of the second ball head connector 1b is in threaded connection with a screw hole arranged on the supporting frame or the light body, and when the ball head screw of the second ball head connector 1b is adjusted, the ball head screw of the second ball head connector 1b can move relative to the supporting frame or the light body so as to drive the illumination unit 2 to generate rotation in the second direction by taking a ball head sphere center of the first ball head connector 1a as the center. Therefore, by adjusting the ball head screw of the second ball head connector 1b, a rotating angle of the illumination unit 2 in the second direction can be adjusted so as to form light regulation in the second direction. Similarly, the second direction refers to a rotating direction of the illumination unit 2 caused when the second ball head connector 1b is adjusted, and the specific direction is decided by the structure of the light-regulating mechanism. The second direction is a direction which is at a certain included angle with the first direction and located on a different straight line from the first direction, and the second direction may be the up-down direction, or may be the left-right direction, or may be any other directions.

The third ball head connector 1c is a ball head adjusting screw, the ball head adjusting screw includes a screw ball head and an adjusting screw. A second rabbet 621 is formed on one side of the second chute 62. The screw ball head is mounted in the second chute 62, and the adjusting screw of the third ball head connector 1c passes through the second rabbet 621, so that the screw ball head can slide in the second chute 62, and relative rotation can be formed between the third ball head connector 1c and the sliding connector 6. By adjusting the adjusting screw, a pushing force can be formed for the sliding connector 6 outside a connecting line between the ball head sphere center of first ball head connector 1a and a ball head sphere center of the second ball head connector 1b, so that the sliding connector 6 generates translation and rotation movement, thereby adjusting the rotating angle of the illumination unit 2 in the first direction and forming light regulation in the first direction.

It should be illustrated that in this embodiment, when the ball head screw of the second ball head connector 1b is adjusted to carry out light regulation in the second direction, the sliding support 4 arranged on the illumination unit 2 also may form certain rotation in the second direction, so that the sliding connector 6 is driven to move along with the sliding support 4. When the screw ball head of the third ball head connector 1c is mounted in the second chute 62, the stress may be formed between the screw ball head and the second chute 62, so that the sliding connector 6 is driven to slide on the sliding support 4, and little deflection of the illumination unit 2 in the first direction is formed. Through setting the reasonable extending direction of the second chute 62, i.e., the above-mentioned set direction, and for example, setting the extending direction of the second chute 62 as the same direction with a moving track of the sliding connector 6 under the condition that the screw ball head of the third ball head connector 1c is not stressed in the process of carrying out light regulation in the second direction, the stress formed on the third ball head connector 1c by regulating in the second direction can be avoided. However, in the actual manufacturing process, the extending direction is difficult to ensure, and the manufacturing process is also very complex. Generally, when the first direction is the up-down direction and the second direction is the left-right direction, the extending direction of the second chute 62 can be set as a straight line direction from the left back to the right front, or a straight line direction from the upper left back to lower right front; and it can simplify the manufacturing process, and although shifting of a lighting light shape in the first direction may be caused when light regulation in the second direction is carried out, such influence can be reduced through a method of firstly carrying out light regulation in the second direction and then carrying out light regulation in the first direction. Preferably, in an initial design state of the light-regulating mechanism, i.e., it is assumed that in a state that there is no manufacturing tolerance or assembly tolerance and the illumination unit does not need to be regulated, the ball head sphere center of the first ball head connector 1a, the ball head sphere center of the second ball head connector 1b and the ball head sphere center of the third ball head connector 1c can be arranged in the same horizontal plane, and the extending direction of the second chute 62 is set as a straight line direction perpendicular to a connecting line between the ball head sphere center of the first ball head connector 1a and the ball head sphere center of the third ball head connector 1c, so that when light regulation in the second direction is carried out, a moving track of the screw ball head of the third ball head connector 1c relative to the sliding connector 6 is closer to that of the screw ball head of the third ball head connector 1c in case of no stress relative to the sliding connector 6, and the stress formed on the third ball head connector 1c by light regulation in the second direction is greatly reduced.

In some embodiments of the light-regulating mechanism of the present disclosure, the first direction is the up-down direction, and the second direction is the left-right direction. In other words, the ball head sphere center of the first ball head connector 1a and the ball head sphere center of the second ball head connector 1b are located on the same horizontal straight line in the left-right direction, so that through adjusting the second ball head connector 1b, the illumination unit 2 can be driven to rotate in the left-right direction relative to the ball head sphere center of the first ball head connector 1a to form light regulation in the left-right direction. The sliding direction of the sliding connector 6 on the sliding support 4 and the sliding direction of the third ball head connector 1c relative to the sliding connector 6 are different, and both are not located on the connecting line between the ball head sphere center of the first ball head connector 1a and the ball head sphere center of the second ball head connector 1b. When the third ball head connector 1c is adjusted, the third ball head connector 1c can take the linear motion in a direction different from the extending direction of the second chute 62, so that the ball head of the third ball head connector 1c slides in the second chute 62, and the sliding connector 6 is driven to move in a direction different from the adjusting direction of the third ball head connector 1c. As the sliding connector 6 is mounted on the sliding support 4 and the sliding support 4 can slide in the first chute 61, movement of the sliding connector 6 can form sliding of the sliding support 4 in the first chute 61, and both the sliding direction of the sliding connector 6 on the sliding support 4 and the sliding direction of the third ball head connector 1c relative to the sliding connector 6 are not located on the connecting line between the ball head sphere center of the first ball head connector 1a and the ball head sphere center of the second ball head connector 1b, and thus, movement of the sliding connector 6 can form a pushing force for the illumination unit 2 outside the connecting line between the ball head sphere center of the first ball head connector 1a and the ball head sphere center of the second ball head connector 1b, the illumination unit 2 is pushed to rotate around the connecting line between the ball head sphere center of the first ball head connector 1a and the ball head sphere center of the second ball head connector 1b, i.e., rotation in the up-down direction is generated, so as to form light regulation in the up-down direction.

As one specific embodiment of the light-regulating mechanism of the present disclosure, as shown in FIG. 8 to FIG. 17, the sliding support 4 is slantingly arranged in a vertical plane in the front-back direction relative to the horizontal plane. Meanwhile, the ball head sphere center of the first ball head connector 1a, the ball head sphere center of the second ball head connector 1b and the ball head sphere center of the third ball head connector 1c are arranged in the same horizontal plane. Specifically, the sliding support 4 may be set to be inclined downwards from front to back, and at the moment, the third ball head connector 1c may be adjusted to move front and back relative to the supporting frame or the light body, so that the sliding connector 6 is pushed to move front and back. When the sliding connector 6 slides forwards relative to the sliding support 4, the sliding support 4 can be driven to rotate downwards. The sliding support 4 is located behind the connecting line between the ball head sphere center of the first ball head connector 1a and the ball head sphere center of the second ball head connector 1b, the optical element which generates the lighting light shape is located in front of the connecting line between the ball head sphere center of the first ball head connector 1a and the ball head sphere center of the second ball head connector 1b, and downward rotation of the sliding support 4 enables the lighting light shape generated by the illumination unit 2 to be shifted upwards so as to form upward light regulation. Meanwhile, when the sliding support 4 rotates downwards, the sliding connector 6 mounted on the sliding support 4 is also driven to generate downward rotation so as to form relative rotation between the sliding connector 6 and the third ball head connector 1c.

In some embodiments of the light-regulating mechanism of the present disclosure, both the first ball head connector 1a and the second ball head connector 1b are ball head screw assemblies, and the ball head screw assembly includes a ball head screw and a ball head nut. The ball head screws of the first ball head connector 1a and the second ball head connector 1b are fixed at different positions on the supporting frame or the light body along the left-right direction, and the ball head nuts are fixed at positions, corresponding to the corresponding ball head screws, on the illumination unit 2. Therefore, in this embodiment, the illumination unit 2 is fixed in the left-right direction, and cannot be regulated in the left-right direction. However, the fixed connecting mode of the ball head screw and the supporting frame or the light body is relatively simple in connecting structure and also relatively low in production cost, and can be applied to some lighting modules of which lighting light shapes have horizontal upper boundaries, e.g., an auxiliary lower beam module, a corner lamp lighting module, a turn-lighting-lamp lighting module and the like. The third ball head connector 1c is a ball head adjusting screw, the ball head adjusting screw includes a screw ball head and an adjusting screw, the sliding connector 6 includes the first chute 61 and the second chute 62, and the second chute 62 is provided with a second rabbet 621. The adjusting screw of the third ball head connector 1c is connected to the supporting frame or the light body through an adjusting structure, such as a thread structure, the screw ball head is mounted in the second chute 62, and the adjusting screw passes through the second rabbet 621. When the adjusting screw of the third ball head connector 1c is adjusted, the third ball head connector 1c moves front and back relative to the supporting frame or the light body, and the screw ball head drives the sliding connector 6 to move front and back, so that sliding of the sliding support 4 in the first chute 61 forms a pushing force outside the connecting line between the ball head sphere center of the first ball head connector 1a and the ball head sphere center of the second ball head connector 1b, and the illumination unit 2 is driven to rotate in the up-down direction around the connecting line between the ball head sphere center of the first ball head connector 1a and the ball head sphere center of the second ball head connector 1b, thereby realizing light regulation in the first direction. Along with rotation of the illumination unit 2, the screw ball head of the third ball head connector 1c also can rotate and/or slide in the second chute 62, and the stress borne by the third ball head connector 1c in the light regulating process can be reduced.

According to one embodiment of a vehicle light module of the present disclosure, the vehicle light module includes a illumination unit 2 and the light-regulating mechanism of any one of the embodiments of the present disclosure. By the light-regulating mechanism of the present disclosure, the illumination unit 2 can be driven to form rotation in the first direction and the second direction so as to realize light regulation on the illumination unit 2 in various different directions.

As one specific embodiment of the vehicle light module of the present disclosure, the illumination unit 2 is provided with a heat dissipating part, and the sliding support 4 is integrally formed on the heat dissipating part. Arrangement of integral formation of the sliding support 4 and the heat dissipating part simplifies the structure of the light-regulating mechanism, and improves light regulating precision and stability. In addition, due to the simple structure of the sliding support 4, the heat dissipating part is also relatively simple to manufacture, so that the manufacturing cost of the vehicle light module is well controlled.

In conclusion, according to the light-regulating mechanism of the present disclosure, force transfer between the third ball head connector 1c and the illumination unit 2 is implemented through the sliding connector 6, and in a case of a short distance between the adjusting direction of the third ball head connector 1c and the connecting line of the ball head sphere center of the first ball head connector 1a and the ball head sphere center of the second ball head connector 1b, through torque transfer of the sliding connector 6, a torque for driving the illumination unit 2 to rotate in the first direction is improved, so that light regulating precision is improved. Therefore, in the present disclosure, a set distance between the third ball head connector 1c and the first ball head connector 1a or the second ball head connector 1b can be not requested any more, so that the light-regulating mechanism of the present disclosure is more free in arrangement, and can be better adapted to the trend of miniaturization and flattening of an existing vehicle light module. The sliding connector 6 can implement conversion between movement of the third ball head connector 1c and rotation of the illumination unit 2, and is high in motion conversion accuracy, so that the light regulating precision of the illumination unit 2 is improved. In addition, the sliding support 4 is relatively simple in structure, and thus, the connected body formed after connecting parts of the sliding support 4 and the illumination unit 2 are connected is relatively simple in structure, which facilitates integrated formation of the connected body.

In a preferred embodiment of the light-regulating mechanism of the present disclosure, arrangement of the first chute 61 and the second chute 62 improves the motion freedom degree of the sliding connector 6, facilitates sliding and rotation of the sliding connector 6, and reduces the stress borne by the third ball head connector 1c in the light regulating process. By arrangement that the sliding track of the first chute 61 and the sliding track of the second chute 62 are not located in the same plane, the torque for the third ball head connector 1c to drive the illumination unit 2 to rotate can be converted into a torque for the third ball head connector 1c to drive the sliding connector 6 to rotate and a torque for the sliding connector 6 to drive the illumination unit 2 to rotate, so that the driving effect and the light regulating precision are further improved. By arrangement of the reinforcing rib 42, the first rabbet 611 and the elastic supporting structure 612, the fit clearance between the sliding connector 6 and the sliding support 4 in the second direction is reduced, the matching accuracy of the sliding connector 6 and the sliding support 4 is improved, and stability and adjusting accuracy of the light shape formed by the illumination unit 2 are improved. By arrangement that the ball head sphere center of the first ball head connector 1a, the ball head sphere center of the second ball head connector 1b and the ball head sphere center of the third ball head connector 1c are arranged in the same horizontal plane, the thickness of the light-regulating mechanism of the present disclosure in the up-down direction can be set to be smaller, and can be more applicable to a flat vehicle light structure.

In the vehicle light module of the present disclosure, the light-regulating mechanism according to any one of the embodiments of the present disclosure is used, and thus, the vehicle light module also has the advantages of the light-regulating mechanisms of the corresponding embodiments. By the integrally formed structure of the sliding support 4 and the heat dissipating part of the vehicle light module, the structure of the light-regulating mechanism is simplified, and convenience in manufacturing of the heat dissipating part is kept.

An vehicle light of the present disclosure uses the vehicle light module according to any one embodiment of the present disclosure, and thus also has the advantages above.

A vehicle of the present disclosure uses the vehicle light according to any one embodiment of the present disclosure, and thus also has the advantages above.

The preferred embodiments of the present disclosure are described in detail above in combination of the accompanying drawings, but the present disclosure is not limited to the specific details in the above-mentioned embodiments. Within the range of the technical concept of the present disclosure, many simple modifications can be made to the technical solutions of the present disclosure, and these simple modifications all fall within the scope of protection of the present disclosure.

In addition, it should be illustrated that all the specific technical characteristics described in the above-mentioned specific embodiments can be combined in any proper mode in case of no conflict, and in order to avoid unnecessary repetition, the present disclosure will not additionally illustrate various possible combination modes.

In addition, various different embodiments of the present disclosure also can be randomly combined, and without departure from the thought of the present disclosure, they also should be regarded as contents disclosed by the present disclosure.

The invention claimed is:

1. A light-regulating mechanism, used for carrying out light regulation on an illumination unit, comprising a first ball head connector, a second ball head connector, a third ball head connector and a sliding connector, wherein
one end of each of the first ball head connector and the second ball head connector is connected with the illumination unit, while the other end is connected with a supporting frame or a light body; and
the illumination unit is provided with a sliding support, the sliding connector is in sliding connection with the sliding support, one end of the third ball head connector is in sliding connection with the sliding connector, the other end of the third ball head connector is supported on the supporting frame or the light body, and the third ball head connector is able to move relative to the supporting frame or the light body so as to drive the sliding connector to move, and the sliding support and the illumination unit connected with the sliding support are driven to rotate through the sliding connector to realize light regulation in a first direction.

2. The light-regulating mechanism according to claim 1, wherein the sliding connector comprises a first chute and a second chute arranged in different directions, the sliding support is mounted in the first chute and is able to slide relative to the first chute, and a ball head of the third ball head connector is mounted in the second chute and is able to slide in the second chute.

3. The light-regulating mechanism according to claim 2, wherein a sliding track of the first chute and a sliding track of the second chute are not located in the same plane.

4. The light-regulating mechanism according to claim 2, wherein the sliding support comprises a sliding supporting plate and a reinforcing rib, the first chute is provided with a first rabbet, the sliding connector is mounted on the sliding support so as to enable the sliding supporting plate to slide in the first chute, and the reinforcing rib is located in the first rabbet.

5. The light-regulating mechanism according to claim 4, wherein an elastic supporting structure is arranged on the inner wall of one side, opposite to the first rabbet, of the first chute, and the elastic supporting structure is in elastic contact with the sliding supporting plate.

6. The light-regulating mechanism according to claim 1, wherein both the first ball head connector and the second ball head connector are ball head screw assemblies, the ball head screw assembly comprises a ball head screw and a ball head nut, the ball head screw is connected with the supporting frame or the light body, and the ball head nut is connected with the illumination unit; the ball head nut of the second ball head connector is connected with the illumination unit, and the ball head screw of the second ball head connector is supported on the supporting frame or the light body and is able to move relative to the supporting frame or the light body, so that light regulation in a second direction is implemented through driving the illumination unit to rotate; and the third ball head connector is a ball head adjusting screw, the ball head adjusting screw comprises a screw ball head and an adjusting screw, the sliding connector comprises a first chute and a second chute, the second chute is provided with a second rabbet, the screw ball head is mounted in the second chute so as to enable the screw ball head to slide in the second chute, and the adjusting screw passes through the second rabbet.

7. The light-regulating mechanism according to claim 6, wherein the first direction is an up-down direction, and the second direction is a left-right direction; and a connecting line between a ball head sphere center of the first ball head connector and a ball head sphere center of the second ball head connector extends along the second direction, and both a sliding direction of the sliding connector on the sliding support and a sliding direction of the third ball head connector relative to the sliding connector are located outside the connecting line between the ball head sphere center of the first ball head connector and the ball head sphere center of the second ball head connector.

8. The light-regulating mechanism according to claim 7, wherein the sliding support is slantingly arranged in a vertical plane in a front-back direction relative to a horizontal plane, and the ball head sphere center of the first ball head connector, the ball head sphere center of the second ball head connector and a ball head sphere center of the third ball head connector are arranged in the same horizontal plane.

9. The light-regulating mechanism according to claim 1, wherein both the first ball head connector and the second ball head connector are ball head screw assemblies, the ball head screw assembly comprises a ball head screw and a ball head nut, the ball head screw is fixed on the supporting frame or the light body, and the ball head nut is fixed on the illumination unit; and the third ball head connector is a ball head adjusting screw, the ball head adjusting screw comprises a screw ball head and an adjusting screw, the sliding connector comprises a first chute and a second chute, the second chute is provided with a second rabbet, the screw ball head is mounted in the second chute so as to enable the screw ball head to slide in the second chute, and the adjusting screw passes through the second rabbet.

10. A vehicle light module, comprising the light-regulating mechanism according to claim 1 and the illumination unit.

11. The vehicle light module according to claim 10, wherein the illumination unit comprises a heat dissipating part, and the sliding support is integrally formed on the heat dissipating part.

12. The vehicle light module according to claim 11, wherein a sliding track of the first chute and a sliding track of the second chute are not located in the same plane.

13. The vehicle light module according to claim 12, wherein the first direction is an up-down direction, and the second direction is a left-right direction; and a connecting line between a ball head sphere center of the first ball head connector and a ball head sphere center of the second ball head connector extends along the second direction, and both a sliding direction of the sliding connector on the sliding support and a sliding direction of the third ball head connector relative to the sliding connector are located outside the connecting line between the ball head sphere center of the first ball head connector and the ball head sphere center of the second ball head connector.

14. The vehicle light module according to claim 11, wherein the sliding support comprises a sliding supporting plate and a reinforcing rib, the first chute is provided with a first rabbet, the sliding connector is mounted on the sliding support so as to enable the sliding supporting plate to slide in the first chute, and the reinforcing rib is located in the first rabbet.

15. The vehicle light module according to claim 14, wherein an elastic supporting structure is arranged on the inner wall of one side, opposite to the first rabbet, of the first chute, and the elastic supporting structure is in elastic contact with the sliding supporting plate.

16. The vehicle light module according to claim 14, wherein the sliding support is slantingly arranged in a vertical plane in a front-back direction relative to a horizontal plane, and the ball head sphere center of the first ball head connector, the ball head sphere center of the second ball head connector and a ball head sphere center of the third ball head connector are arranged in the same horizontal plane.

17. A vehicle light, comprising the vehicle light module according to claim 10.

18. The vehicle light module according to claim 10, wherein the sliding connector comprises a first chute and a second chute arranged in different directions, the sliding support is mounted in the first chute and is able to slide relative to the first chute, and a ball head of the third ball head connector is mounted in the second chute and is able to slide in the second chute.

19. The vehicle light module according to claim 10, wherein both the first ball head connector and the second ball head connector are ball head screw assemblies, the ball head screw assembly comprises a ball head screw and a ball head nut, the ball head screw is connected with the supporting frame or the light body, and the ball head nut is connected with the illumination unit; the ball head nut of the second ball head connector is connected with the illumination unit, and the ball head screw of the second ball head connector is supported on the supporting frame or the light body and is able to move relative to the supporting frame or the light body, so that light regulation in a second direction is implemented through driving the illumination unit to rotate; and the third ball head connector is a ball head adjusting screw, the ball head adjusting screw comprises a screw ball head and an adjusting screw, the sliding connector comprises a first chute and a second chute, the second chute is provided with a second rabbet, the screw ball head is mounted in the second chute so as to enable the screw ball head to slide in the second chute, and the adjusting screw passes through the second rabbet.

20. The vehicle light module according to claim 10, wherein both the first ball head connector and the second ball head connector are ball head screw assemblies, the ball head screw assembly comprises a ball head screw and a ball head nut, the ball head screw is fixed on the supporting frame or the light body, and the ball head nut is fixed on the illumination unit; and the third ball head connector is a ball head adjusting screw, the ball head adjusting screw comprises a screw ball head and an adjusting screw, the sliding connector comprises a first chute and a second chute, the second chute is provided with a second rabbet, the screw ball head is mounted in the second chute so as to enable the screw ball head to slide in the second chute, and the adjusting screw passes through the second rabbet.

* * * * *